May 30, 1944.   A. CRAMWINCKEL ET AL   2,349,941
FILM APPARATUS
Filed July 3, 1941
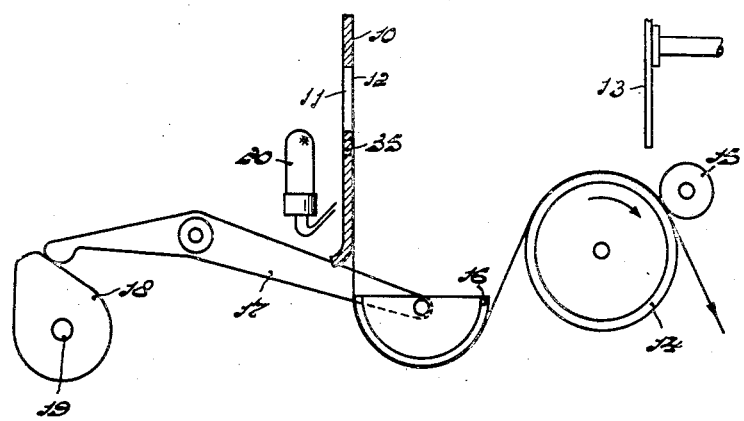
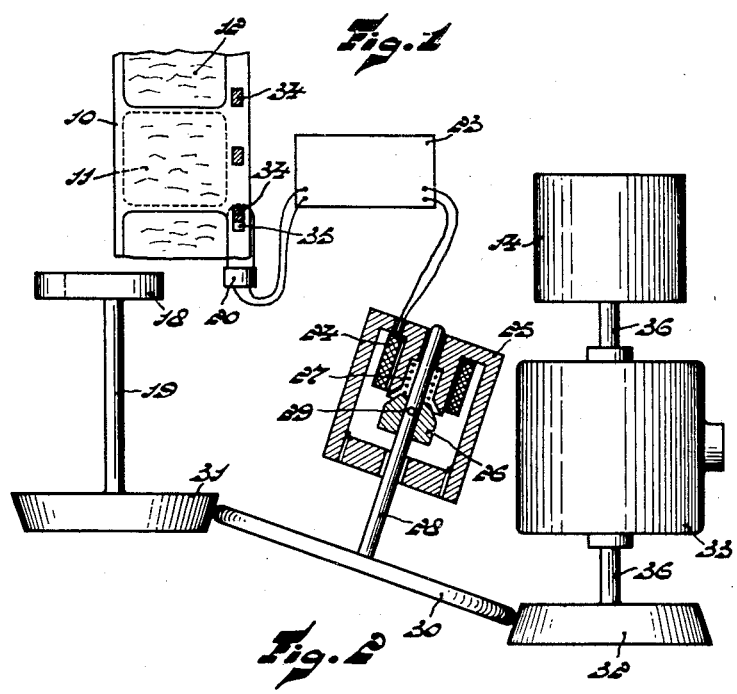
INVENTORS
A. Cramwinckel and
F. L. van Weenen
BY
E. F. Wenderoth
ATTORNEY Patented May 30, 1944

2,349,941

UNITED STATES PATENT OFFICE 2,349,941

FILM APPARATUS

Arnaud Cramwinckel and Franciscus Lambertus van Weenen, Eindhoven, Netherlands; vested in the Alien Property Custodian Application July 3, 1941, Serial No. 401,026
In the Netherlands July 6, 1940

4 Claims. (Cl. 88—18.6)

This invention relates to apparatus for the stepwise driving of a film band provided with optical marks.

For driving the usual photographic celluloid films use is made of a number of small apertures, the so-called film perforation, which are provided at one side or on both sides of the picture or sound-plus-picture film. This way of driving films imposes definite conditions on the mechanical strength of the film material. In regard to thin films such as films of sensitised regenerated cellulose having a thickness of 40 microns, it has already been proposed to replace the usual perforations by optical marks which act as optical perforations. These marks are scanned by means of an electro-optical element and then serve, similarly to mechanical perforations, to ensure the correct position of the picture in the picture gate.

Film apparatus adapted for driving the said films may be divided into two groups i. e. apparatus with uniform travel of the film and optical compensation of the motion of the picture in the picture gate and apparatus with periodic stepwise travel of the film picture with exposure and representation during the standstill period.

The present invention solely concerns apparatus of the second group. When making use of perforated films the perforations ensure that the film picture occupies the correct position in the picture gate independently of the shrinkage of the film. With non-perforated films having optical marks these marks must perform this function. In the well-known constructions these marks are scanned at a point where the film periodically stops during the exposure period, for instance in the picture gate. If the marks deviate from a position determined for the correct position of the picture, an electro-optical control becomes operative and adjusts the linear driving speed of the film relatively to the periodic stepwise movement or conversely until the position of the picture has been corrected.

Such apparatus comprise a picture gate, at least one driving roller in the direction of motion of the film behind the picture gate, by which the film is uniformly driven in a continuous way, a mechanical device between the driving roller and the picture gate for periodic stepwise motion of the film in front of the picture gate and an optical control device which ensures the correct position of the picture in the picture gate by means of the optical marks on the film.

Furthermore apparatus of this kind have come to be known in which periodic braking of the film takes place in the direction of motion of the film in front of the picture gate, the correct position of the picture in the gate being also ensured by means of optical marks on the film.

According to the invention a variable coupling is provided between the roller driving the film in a continuous manner and the mechanical device for stepwise displacement of the film, whose ratio of transmission is controlled by means of the optical marks to be scanned on the film.

The advantage of this construction is the simple, rapid and suitable control obtained. If the optical marks deviate from their initial adjustment, due to shrinkage of the film, the control device becomes operative and directly adjusts the ratio between the linear film speed and the number of picture displacements per unit of film-length.

In one embodiment of the invention this mechanical coupling consists of two conical friction wheels, one of which is seated on the driving shaft of the smooth roller driving the film in a continuous manner, whereas the other is mounted on the driving shaft of the device for stepwise displacement of the film, and whose generatrices facing each other extend parallel with each other; a third friction wheel located between the two first-mentioned wheels contacts with them and can be shifted in an axial direction by an electromagnet whose excitation is controlled by the electro-optical controlling device with the aid of the marks on the film.

Since the generatrices, facing each other, of the two conical wheels extend parallel with each other, the intermediate wheel can be displaced in this direction whilst maintaining the contact with the surface of each wheel. Upon displacement of the intermediate wheel the diameter of the circle of contact on one wheel is increased, but reduced on the other wheel and conversely, so that the ratio of transmission is modified between both shafts. This modification can take place only over a narrow region, determined by the height and the slope of the conical wheels, making the whole system stable. Since the shaft of the intermediate wheel, which is axially shifted in its bearings, turns at the same time in its bearings during operation, it is not necessary for the electro-magnet to overcome the friction of the bearing during the control movement. Hence, control of the picture in the picture gate takes place even at the slightest deviations from the normal position, without jerks and mechanical back lash.

The invention will be more fully explained by reference to the accompanying drawing, given by way of example. Fig. 1 is a detail view of the film guide together with the chief means for driving the film. Fig. 2 is a detail view of the device for driving and controlling the film.

In Fig. 1 the reference 10 designates the film path in which is left clear the film gate 11. By means of a rotating shutter 13 the film 12 is periodically exposed at the picture gate and this more particularly at the moment during which the film band is not driven. The shaft of this shutter is coupled fixedly to the camshaft 19. The film is driven by means of a cylindrical roller 14 which rotates in the direction of the arrow and has a roughened surface for increasing the friction between film band and roller. A pressure roller 15 ensures a slipfree drive of the film band. Between the roller 14 and the film picture gate 11 is provided a device for obtaining the required stepwise displacement of the film at the picture gate. This device consists of a shoe 16 provided on a lever 17 which is swung back and forth by the cam 18. The roller 14 is continuously driven and consequently reduces the film loop between this roller and the picture gate 11. When the cam 18 drives the lever 17 the shoe 16 engages this film loop and consequently shifts the film 12 in front of the picture gate 11.

Since the stroke of the shoe 16 always remains the same the amount of displacement of the film 12 in front of the picture gate solely depends of the film-length displaced by the roller 14 during the time between two changes of the picture, this time being determined by the speed of revolution of the cam disc 18. The number of pictures per film-length is larger as the shrinkage of the film is greater. With a shrunk film a larger number of periodic displacements of the film in front of the picture gate must consequently take place over the same length of film. Hence, the speed of the cam disc 18 relatively to the roller 14 has to be increased. Control of the speed of the cam disc 18 and consequently of the number of picture displacements per length of film is effected by means of optical marks provided on the film. This will be explained by reference to Fig. 2.

In the film guide 10 an aperture 35 is provided adjacent the picture gate 11, the optical marks of the film may consist of a number of black blocks e. g. corresponding to the normal perforation of a narrow film, which pass in front of the said aperture. Behind the aperture 35 is located a photoelectric element 20 which is exposed through the film and through the aperture by means of the light of the projection light source which falls adjacent the picture gate.

The aperture 35 may have the same size as the optical marks 34. This aperture is situated relatively to the picture frame as to be covered half by the black blocks when the film picture occupies the correct position in the picture gate 11. Displacement of this film picture in the gate involves a variation of the quantity of light passing through this aperture and consequently also a variation of the average luminous intensity on the photo-cell 20. This photo-cell is connected through the intermediary of a direct current amplifier 23 to the exciting coil 24 of a control-device described hereinafter.

The shaft 36 of the roller 14 is provided with a conical friction wheel 32, the friction wheel 31 seated on the shaft 19 of the cam disc 18 being also conical. The apices of these cones are so chosen that the generatrices of cones 31 and 32 facing each other extend parallel with each other.

Hence, the intermediate wheel 30 located between the two conical wheels 31 and 32 is mounted upon the shaft 28 extending parallel with these generatrices. Thus this wheel 30 can be shifted in the direction of shaft 28 whilst remaining in contact with the surfaces of the conical wheels. By this axial movement of the wheel 30 the diameter of the circle of contact is increased on one cone and reduced on the other cone and conversely, so that the ratio of transmission between the shafts 36 and 19 is variable.

By means of a pin 29 the shaft 28 has seated on it a cone 26, both of which are made from magnetisable material having as little remanence as possible. Opposite this cone 26 a conical aperture is provided in an internally projecting cylindrical portion of the housing 25 also consisting of remanence free magnetisable material. This cylindrical portion of housing 25 is surrounded by a number of wire turns 24 connected in the output circuit of the amplifier 23 of the electro-optical control device.

When in accordance with the position of the marks 34 relatively to the aperture 35 the photo-cell 20 is exposed to a greater or less degree, the coil 24 will be energised to a greater or less extent so that the cone 26 either approaches the cylindrical member of the housing 25 against the action of spring 27 or is pushed outwards by spring 27. Consequently the axial position of the intermediate wheel 30 will be altered, in accordance with the position of the marks 34 relatively to the aperture in the film path 35, as a result of which the number of picture changes per time unit is so controlled as to correctly position the film picture in the picture gate 11.

The above control has the advantage that it occurs without friction and consequently without mechanical back lash, since the shaft 28 continuously rotates during control. The friction of the bearing is overcome by rotation and upon axial displacement no additional friction need be overcome in an axial direction.

This means that even the slightest displacement of the film picture in the film gate involves a compensating control so that unsteadiness of the picture is practically imperceptible.

For driving the whole film apparatus one of the two coupled shafts 36 or 19 must be driven. In the form of construction illustrated the motor 33 is seated on the shaft 36 so that the speed of this shaft may be assumed to be constant, whereas that of shaft 19 is controlled. However, this form of construction is not imperative; the shaft 19, also, may be directly driven, since the control device only concerns the speed ratio between the shafts 19 and 36. The shutter 13 must be coupled without slip with the device for the picture displacement i. e. with the shaft 19.

It will be appreciated that besides the driving means illustrated there may also be provided driving means for take up or take off reels. This, however, does not appear to be of any material pertinence to the invention.

What we claim is:

1. An apparatus for periodically driving a film band provided with pictures and optical marks, comprising a picture gate, a member for continuously driving the film without slippage, a shoe member arranged to reciprocate between two predetermined positions, said shoe member in one position engaging the film at a portion between the first member and the picture gate and forming the same into a loop of predetermined length, means to drive one of said members at a substantially constant speed, means for driving the other member from the driven member and comprising a variable coupling, and means for controlling the position of the pictures at the picture gate, said latter means including an electro-optical device controlled by the optical marks and controlling said coupling.

2. An apparatus for periodically driving a film band provided with optical marks, comprising a picture gate, a member for continuously driving the film without slippage, a shoe member arranged to reciprocate between two predetermined positions, said shoe member in one position engaging the film at a portion between the first member and the picture gate and forming the same into a loop of predetermined length, means to move one of said members at a substantially constant speed, and means to drive the other member from the driven member, said latter means comprising a conical friction wheel connected to the continuous driving means, a conical friction wheel connected to the periodic moving means and having its generatrix parallel to the generatrix of the first friction wheel, a movable coupling wheel engaging the conical friction wheels, an electro-optical control actuated by the optical marks of the film, and an electromagnet actuated by said control for axially displacing the coupling wheel along the generatrices of the conical wheels.

3. An apparatus for periodically driving a film band provided with optical marks, comprising a picture gate, a member for continuously driving the film without slippage, a shoe member arranged to reciprocate between two predetermined positions, said shoe member in one position engaging the film at a portion between the first member and the picture gate and forming the same into a loop of predetermined length, means to move one of said members at a substantially constant speed, and means for driving the other member from the driven member, said latter means comprising a variable speed coupling, an electromagnet for actuating said coupling comprising a magnetizing member having a conical cavity, a movable conical member of magnetizable material, and a driving shaft connected to said conical member, and an electro-optical control device for actuating the electromagnet, said control being actuated by the optical marks.

4. An apparatus for periodically driving a film band provided with optical marks, comprising a picture gate, a roller for continuously driving the film without slippage, a shoe member arranged to reciprocate between two predetermined positions, said shoe member in one position engaging the film at a portion between the roller and the picture gate and forming the same into a loop of predetermined length, a motor to rotate said roller at a substantially constant speed, and means for driving said shoe member from the motor, said means comprising a variable speed coupling and an electro-optical control device for varying the coupling, said control device being actuated by the optical marks.

ARNAUD CRAMWINCKEL.
FRANCISCUS LAMBERTUS van WEENEN.